(12) United States Patent
Kim et al.

(10) Patent No.: US 10,851,219 B2
(45) Date of Patent: Dec. 1, 2020

(54) PLASTICIZER COMPOSITION, RESIN COMPOSITION, AND METHODS FOR PREPARING SAME

(71) Applicant: LG CHEM, LTD., Seoul (KR)

(72) Inventors: Hyun Kyu Kim, Daejeon (KR); Mi Yeon Lee, Daejeon (KR); Yun Ki Cho, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/567,519

(22) PCT Filed: Oct. 27, 2016

(86) PCT No.: PCT/KR2016/012161
§ 371 (c)(1),
(2) Date: Oct. 18, 2017

(87) PCT Pub. No.: WO2017/074055
PCT Pub. Date: May 4, 2017

(65) Prior Publication Data
US 2018/0100052 A1    Apr. 12, 2018

(30) Foreign Application Priority Data
Oct. 27, 2015 (KR) .................. 10-2015-0149655

(51) Int. Cl.
| | | |
|---|---|---|
| C08K 5/00 | (2006.01) | |
| C08K 5/12 | (2006.01) | |
| C08L 91/00 | (2006.01) | |
| C08L 73/00 | (2006.01) | |
| C08K 5/10 | (2006.01) | |
| C08L 101/00 | (2006.01) | |
| C08K 5/1515 | (2006.01) | |
| C08L 23/06 | (2006.01) | |
| C08L 23/08 | (2006.01) | |
| C08L 23/12 | (2006.01) | |
| C08L 25/06 | (2006.01) | |
| C08L 27/06 | (2006.01) | |

(52) U.S. Cl.
CPC .............. *C08K 5/0016* (2013.01); *C08K 5/00* (2013.01); *C08K 5/10* (2013.01); *C08K 5/12* (2013.01); *C08K 5/1515* (2013.01); *C08L 23/06* (2013.01); *C08L 23/0853* (2013.01); *C08L 23/12* (2013.01); *C08L 25/06* (2013.01); *C08L 27/06* (2013.01); *C08L 73/00* (2013.01); *C08L 91/00* (2013.01); *C08L 101/00* (2013.01); *C08L 2207/04* (2013.01)

(58) Field of Classification Search
CPC .................................................... C08K 5/0016
See application file for complete search history.

(56) References Cited

U.S. PATENT DOCUMENTS

| | | |
|---|---|---|
| 5,374,377 A | 12/1994 | Nguyen et al. |
| 2007/0037926 A1 | 2/2007 | Olsen et al. |
| 2012/0181056 A1 | 7/2012 | Chaudhary et al. |
| 2012/0181057 A1 | 7/2012 | Chaudhary et al. |
| 2013/0089728 A1 | 4/2013 | Kobayashi et al. |
| 2013/0137789 A1 | 5/2013 | Olsen et al. |
| 2013/0244017 A1* | 9/2013 | Tresino .................. B29C 41/08 428/220 |
| 2015/0051279 A1 | 2/2015 | Uhr et al. |
| 2015/0051326 A1 | 2/2015 | Sunkara et al. |
| 2015/0126624 A1 | 5/2015 | Baseeth |
| 2015/0203660 A1 | 7/2015 | Uhr et al. |
| 2018/0022893 A1 | 1/2018 | Kim et al. |
| 2018/0265672 A1 | 9/2018 | Kim et al. |

FOREIGN PATENT DOCUMENTS

| | | | |
|---|---|---|---|
| CN | 102666696 A | | 9/2012 |
| CN | 102666697 A | | 9/2012 |
| CN | 103694598 A | * | 4/2014 |
| CN | 107207865 A | | 9/2017 |
| EP | 3272800 A1 | | 1/2018 |
| KR | 10-2002-0035930 A | | 5/2002 |
| KR | 10-2012-0104527 A | | 9/2012 |
| KR | 10-2015-0024837 A | | 3/2015 |
| WO | 2007-021987 A | | 2/2007 |
| WO | 2018/008914 A1 | | 1/2018 |

OTHER PUBLICATIONS

Machine translation of CN-103694598-A. (Year: 2014).*
Valtris (Plas-Chek 775) (Year: 2019).*
Jiang, et al.: "Properties of trimellitic acid triester and its application in PVC products", Plastics Additives, No. 6, 2001, pp. 22-29.

* cited by examiner

*Primary Examiner* — Wenwen Cai
(74) *Attorney, Agent, or Firm* — Dentons US LLP

(57) ABSTRACT

The present invention relates to a plasticizer composition, a resin composition, and methods for preparing the same. The present invention can provide: a plasticizer capable of improving properties, such as plasticization efficiency, transitivity, tensile strength, elongation, and tension/elongation retention, required when a resin composition is used as a plasticizer, by improving poor properties caused due to structural limitations; and a resin composition containing the same.

5 Claims, 2 Drawing Sheets

PLASTICIZER COMPOSITION, RESIN COMPOSITION, AND METHODS FOR PREPARING SAME

CROSS-REFERENCE TO RELATED APPLICATION

This application is a National Stage Entry of International Application No. PCT/KR2016/012161, filed on Oct. 27, 2016, and claims the benefit of Korean Application No. 10-2015-0149655, filed on Oct. 27, 2015, all of which are hereby incorporated by reference in their entirety for all purposes as if fully set forth herein.

TECHNICAL FIELD

The present invention relates to a plasticizer composition, a resin composition, and a method of preparing the same.

BACKGROUND ART

Generally, a plasticizer forms an ester through a reaction between an alcohol and a polycarboxylic acid such as phthalic acid or adipic acid. In addition, there has been continuing research on compositions of plasticizers that can replace phthalate-based plasticizers such as terephthalate-based, adipate-based, and other polymer-based plasticizers in consideration of domestic and international regulations on phthalate-based plasticizers which are harmful to human bodies.

Meanwhile, in compound industries requiring high heat resistance and low volatile loss as main desired physical properties, suitable plasticizers should be used in consideration of the desired physical properties. In the case of polyvinyl chloride (PVC) compounds used for electric wires and cables, additives such as a plasticizer, a stabilizer, and a pigment are mixed with a PVC resin according to characteristics of the PVC compounds required for corresponding specifications, such as tensile strength, an elongation rate, plasticization efficiency, volatile loss, tension retention and elongation retention and the like.

Recently, because diisodecyl phthalate (DIDP), which is currently typically used as a compound for electric wires and automotive fabrics in the compound industry, is an observational chemical as an endocrine disruptor and its use is being regulated due to environmental issues, there is an increasing demand for the development of environmentally-friendly products for replacing DIDP. In addition, in the case of trioctyl trimellitate (TOTM or TEHTM), which is used as a compound for electric wires in the same compound industry, since trimellitic anhydride, as a raw material thereof, contains a small amount of phthalic anhydride, a final product is likely to contain di(2-ethylhexyl) phthalate (DEHP), and thus it is not possible to fundamentally solve a requirement of non-phthalate. In order to replace these products, it is necessary to develop a novel product having levels of properties equal to or higher than those of the above-described products in terms of quality.

Accordingly, research is being conducted on the development of a novel environmentally-friendly plasticizer composition product having more excellent properties than those of DIDP and TOTM to ensure a vinyl chloride-based resin composition which is free from environmental issues and excellent in terms of quality.

PRIOR-ART DOCUMENTS

Patent Documents

Korean Laid-open Patent Application No. 2002-0035930

DISCLOSURE

Technical Problem

Therefore, during research on plasticizers, the present inventors developed a plasticizer composition capable of significantly improving properties of a polyvinyl chloride (PVC) resin composition, and thus completed the present invention.

That is, the present invention is directed to providing a plasticizer capable of improving properties required when the plasticizer is used as a plasticizer for a resin composition, such as hardness, tension retention and elongation retention, migration resistance, volatile loss, and the like, a method of preparing the same, and a resin composition including the same.

Technical Solution

According to an embodiment of the present invention, there is provided a plasticizer composition which includes an epoxidized oil; and a trimellitate-based material represented by Chemical Formula 1 below, wherein a weight ratio of the epoxidized oil and the trimellitate-based material is 99:1 to 10:90.

[Chemical Formula 1]

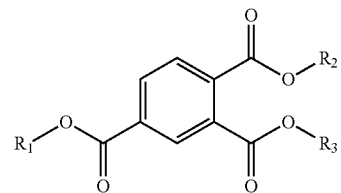

In Chemical Formula 1, $R_1$ to $R_3$ are each independently an alkyl group having 8 to 12 carbon atoms, and a sum of the number of carbon atoms in the alkyl groups of $R_1$ to $R_3$ is 25 to 36.

According to another embodiment of the present invention, there is provided a resin composition which includes 100 parts by weight of a resin; and 5 to 150 parts by weight of the above-described plasticizer composition.

The resin may be one or more selected from the group consisting of ethylene vinyl acetate, polyethylene, polypropylene, polyvinyl chloride, polystyrene, polyurethane, and a thermoplastic elastomer.

Advantageous Effects

A plasticizer composition according to an embodiment of the present invention can provide excellent properties such as plasticization efficiency, tensile strength, an elongation rate, migration resistance, volatilization resistance, and the like when used in a resin composition.

BEST MODE

EXAMPLE

Figure 1:
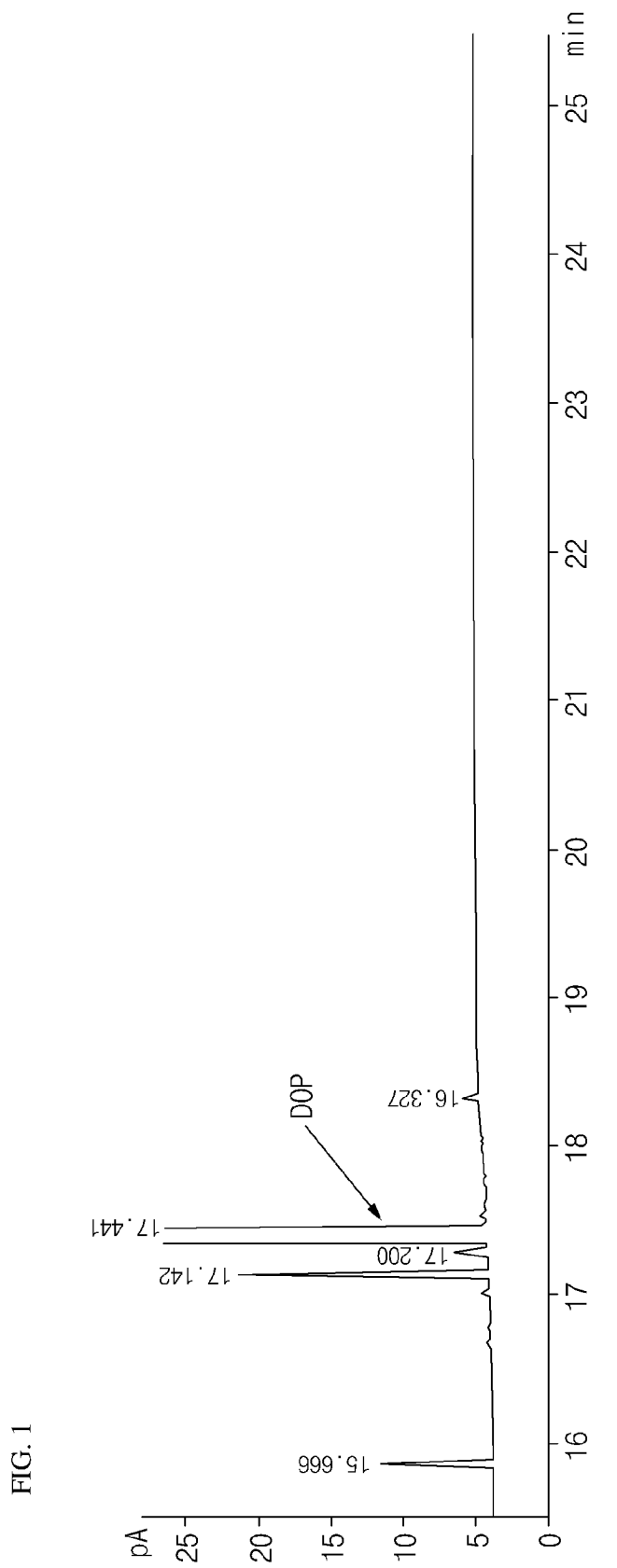
FIG. 1 shows a gas chromatography (GC) analysis result of di(2-ethylhexyl) phthalate.

Hereinafter, embodiments will be described in detail for promoting an understanding of the present invention. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Preparation Example 1: Preparation of ESO

Epoxidized soybean oil (ESO; commercially available from SAJO) was used.

Preparation Example 2: Preparation of Triisononyl Trimellitate 576.3 g of trimellitic acid (TMA) and 1,948 g of isononyl alcohol were used as reaction components to finally obtain 1,731 g of a triisononyl trimellitate product (yield: 98%).

Preparation Example 3: Preparation of Reaction Product of C8 and C10 Mixed Alcohol and TMA 576.3 g of TMA, 878.9 g of n-octyl alcohol, and 1,068.5 g of n-decyl alcohol were used as reaction components to finally obtain 1,731 g of a trimellitate product (yield: 98%).

Examples and comparative examples were prepared as follows.

TABLE 1

| | Epoxidized oil | Trimellitate-based material | Mixing weight ratio |
|---|---|---|---|
| Example 1 | Preparation Example 1 (ESO) | Preparation Example 2 | 9:1 |
| Example 2 | | | 7:3 |
| Example 3 | | | 5:5 |
| Example 4 | | | 3:7 |
| Example 5 | | | 1:9 |
| Example 6 | Preparation Example 1 (ESO) | Preparation Example 3 | 9:1 |
| Example 7 | | | 7:3 |
| Example 8 | | | 5:5 |
| Example 9 | | | 3:7 |
| Example 10 | | | 1:9 |

TABLE 2

| | Epoxidized oil | Trimellitate-based material | Mixing weight ratio |
|---|---|---|---|
| Comparative Example 1 | ESO | TEHTM | 0.5:9.5 |
| Comparative Example 2 | ESO | TINTM | 0.7:9.3 |
| Comparative Example 3 | ESO | Preparation Example 3 | 0.5:9.5 |
| Comparative Example 4 | ESO | TEHTM | 5:5 |
| Comparative Example 5 | ESO | TBTM | 5:5 |

<Test Items>

Measurement of Hardness

According to ASTM D2240, Shore (shore "D") hardness was measured at 25° C. under 3T and 10s conditions.

Measurement of Tensile Strength

According to ASTM D638, each specimen was pulled at a cross head speed of 200 mm/min (1T) using a tester, U.T.M, (Manufacturer; Instron, Model No.; 4466), and a point at which the specimen was broken was then measured. The tensile strength was calculated as follows:

Tensile strength (kgf/mm$^2$)=Load value (kgf)/Thickness (mm)×Width (mm)

Measurement of Elongation Rate

According to ASTM D638, each specimen was pulled at a cross head speed of 200 mm/min (1T) using the U.T.M, and a point at which the specimen was broken was then measured. The elongation rate was calculated as follows:

Elongation rate (%)=[Length after elongation/Initial length]×100

Measurement of Migration Loss

A specimen having a thickness of 2 mm or more was obtained according to KSM-3156, PS plates were attached to both sides of the specimen, and then a load of 2 kgf/cm$^2$ was applied thereto. The specimen was kept in a forced convection oven (80° C.) for 72 hours, then taken out of the oven, and cooled at room temperature for 4 hours. Thereafter, the PS plates attached to both sides of the specimen were removed, weights before and after being kept in the oven were measured, and thus a migration loss was calculated by the equation as follows.

Migration loss (%)=[(Initial weight of specimen at room temperature–Weight of specimen after being kept in oven)/Initial weight of specimen at room temperature]×100

Measurement of Volatile Loss

The specimen thus prepared was processed at 113° C. for 168 hours, and then a weight of the specimen was measured.

Volatile loss (%)=[(Initial weight of specimen–Weight of specimen after being processed)/Initial weight of specimen]×100

Measurement of Tension Retention and Elongation Retention

In the measurement of tension retention and elongation retention, each specimen was heated at 135° C. for 168 hours, and then tension and an elongation rate remaining in the specimen were measured. Measurement methods thereof are the same as the above measurement methods of tensile strength and an elongation rate.

Experimental Example 1: Evaluation of Properties of Resin Specimen

Each mixed plasticizer composition according to examples and comparative examples listed in Tables 1 and 2 was used to prepare a specimen.

The specimen was prepared with reference to ASTM D638. With respect to 100 parts by weight of a polyvinyl chloride (PVC) resin (LS100), 50 parts by weight of each plasticizer composition prepared in examples and comparative examples, 3 parts by weight of RUP-144 (commercially available from ADEKA KOREA) as a stabilizer, 40 parts by weight of Omya 1T (commercially available from Omya) as a filler, and 0.3 parts by weight of St-A (commercially available from ISU CHEMICAL) as a lubricant were mixed at 98° C. and 700 rpm. Afterward, the resulting mixture was subjected to roll-milling at 160° C. for 4 minutes using a rolling mill, and pressed for 2.5 minutes (low pressure) and for 2 minutes (high pressure) at 180° C. using a press, thereby preparing a specimen.

Properties of each specimen were evaluated by the test items, results of which are shown in Table 3 below.

TABLE 3

| | Hardness (Shore "D") | Tensile strength (kg/cm$^2$) | Tension retention (%) | Elongation rate (%) | Elongation retention (%) | Migration loss (%) | Volatile loss (%) | Cold resistance (° C.) |
|---|---|---|---|---|---|---|---|---|
| Example 1 | 57.3 | 211.6 | 99.2 | 280.2 | 95.6 | 0.31 | 0.46 | −14.0 |
| Example 2 | 58.0 | 210.5 | 97.8 | 271.8 | 93.4 | 0.51 | 0.53 | −14.0 |
| Example 3 | 58.6 | 209.7 | 93.7 | 271.1 | 91.5 | 0.76 | 0.58 | −15.0 |
| Example 4 | 59.1 | 210.6 | 93.1 | 268.7 | 88.6 | 1.24 | 0.65 | −15.0 |
| Example 5 | 59.8 | 209.1 | 91.2 | 264.7 | 88.1 | 1.50 | 0.85 | −15.5 |
| Example 6 | 55.3 | 248.9 | 102.8 | 298.7 | 99.8 | 0.43 | 0.10 | −17.0 |
| Example 7 | 55.9 | 245.7 | 100.5 | 292.4 | 98.2 | 0.55 | 0.10 | −17.5 |
| Example 8 | 56.4 | 235.6 | 101.1 | 290.5 | 98.4 | 0.64 | 0.14 | −17.5 |
| Example 9 | 57.0 | 231.5 | 102.3 | 289.7 | 97.0 | 0.87 | 0.35 | −18.0 |
| Example 10 | 57.3 | 222.6 | 101.5 | 286.4 | 97.8 | 1.15 | 0.56 | −19.0 |
| Comparative Example 1 | 59.6 | 178.4 | 80.6 | 231.2 | 81.2 | 2.68 | 2.07 | −13.5 |
| Comparative Example 2 | 60.5 | 203.1 | 90.2 | 245.7 | 80.2 | 1.88 | 1.03 | −15.5 |
| Comparative Example 3 | 59.7 | 202.3 | 92.3 | 265.4 | 90.1 | 1.66 | 0.98 | −18.0 |
| Comparative Example 4 | 58.5 | 188.7 | 88.8 | 251.2 | 80.6 | 1.87 | 1.68 | −12.5 |
| Comparative Example 5 | 55.8 | 167.4 | 64.2 | 188.6 | 74.5 | 2.97 | 5.82 | −20.0 |

Referring to Table 3, it can be confirmed that Examples 1 to 5, in which a mixing ratio was appropriately adjusted, that is, an epoxidized oil was added at an amount of one plasticizer level rather than an auxiliary stabilizer level, exhibited excellent performance such as plasticization efficiency, tensile strength, an elongation rate, tension retention, elongation retention, and migration resistance, and an effect of improved volatile loss compared to Comparative Example 2. Also, it can be confirmed that, when Examples 6 to 10 and Comparative Example 2 were compared, an improvement in performance such as plasticization efficiency, tensile strength, an elongation rate, tension retention, elongation retention, migration resistance and volatile loss was also exhibited.

In addition, when Comparative Examples 1 and 4 were compared, it can be seen that an effect when an epoxidized oil was added at the main plasticizer level and not at the auxiliary stabilizer level was significant. That is, it can be confirmed that plasticization efficiency, tensile strength, an elongation rate, tension retention, and elongation retention may be significantly improved, and migration or volatile loss may also be improved. That is, it can be seen that, considering that TEHTM in Comparative Example 4 contains DEHP, which is an environmentally hazardous substance, the plasticizers according to Examples 1 to 10 may be useful as products capable of replacing the plasticizer according to Comparative Example 4 because they exhibited levels of properties equal to or higher than those of the plasticizer according to Comparative Example 4.

In addition, it can be seen that Comparative Example 5, in which a trimellitate-based material having a small number of carbon atoms was used, exhibited poor mechanical properties such as tensile strength and an elongation rate as well as poor loss properties such as volatile loss and migration loss. Therefore, it can be confirmed that, when a trimellitate-based material is applied, adjusting the number of carbon atoms thereof and choosing a branched type or a linear type should be carefully performed.

Experimental Example 2: Evaluation of Whether Environmentally Hazardous Substance is Included In order to determine whether branched TEHTM having 8 carbon atoms contains DEHP, which is an environmentally hazardous substance, DEHP (commercially available from LG Chem.) and TEHTM (commercially available from UPC Technology Corporation) were used to perform a gas chromatography (GC) analysis, results of which are shown in FIGS. 1 and 2.

Figure 2:
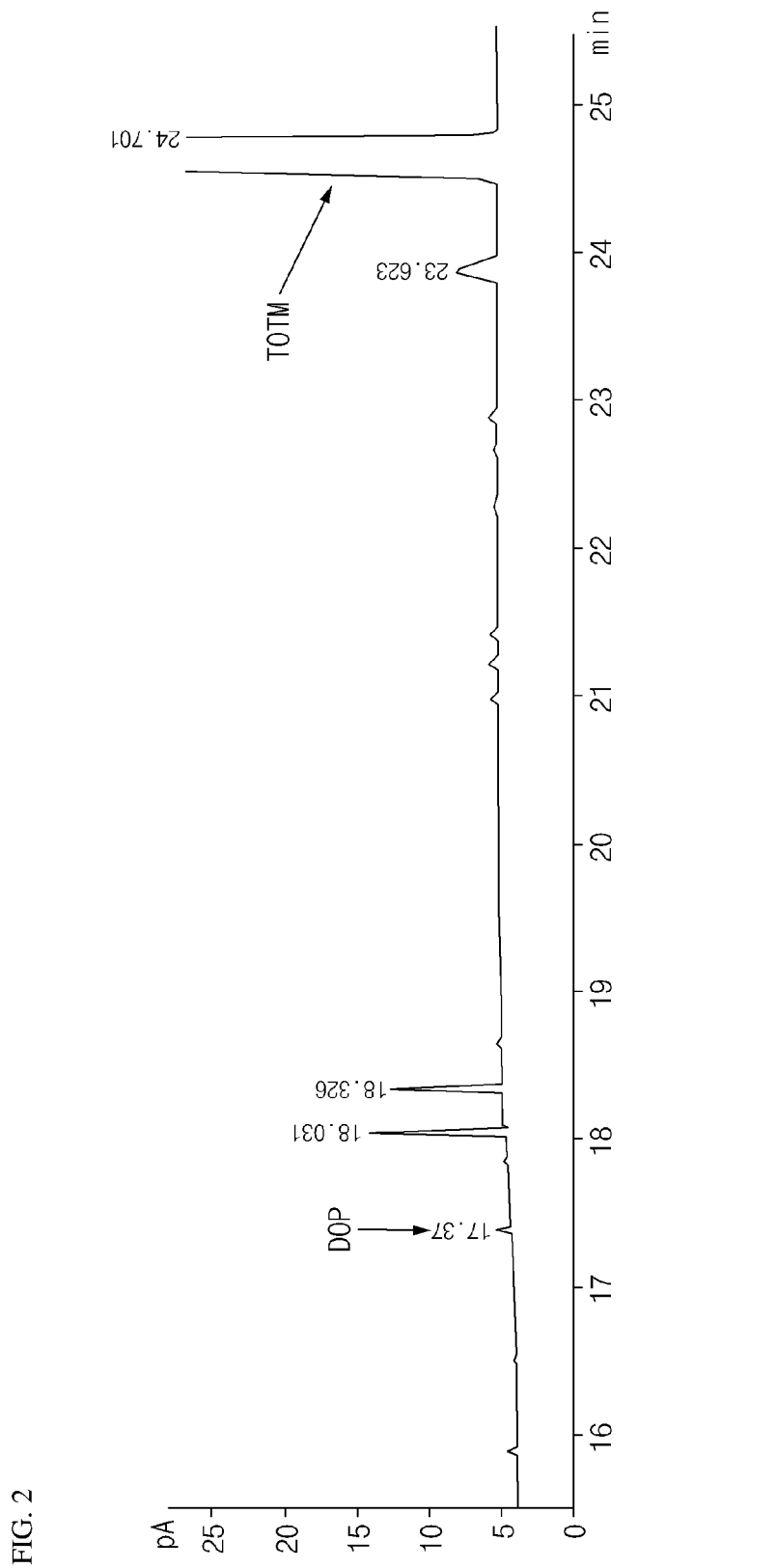
FIG. 2 shows a GC analysis result of tri(2-ethylhexyl) trimellitate.

FIG. 1 shows a GC analysis result of DEHP, and FIG. 2 shows a GC analysis result of TEHTM. Referring to FIGS. 1 and 2, it can be seen that DEHP, which is a material eluted at about 17 minutes, exhibited a peak at this time, and such a peak was also exhibited in the case of TEHTM. Therefore, it can be seen that commercially available TEHTM essentially includes DEHP even though a small amount of DEHP is included.

While embodiments have been described in detail above, the scope of embodiments of the present invention is not limited thereto, but encompasses several modifications and improvements by those skilled in the art using basic concepts of embodiments of the present invention defined by the appended claims.

MODE FOR INVENTION

Hereinafter, the present invention will be described in detail.

First, the present invention has a technical feature in providing a plasticizer composition capable of improving poor properties caused by structural limitations.

According to an embodiment of the present invention, there is provided a plasticizer composition including an epoxidized oil. Specifically, the epoxidized oil may be included at a content of 1 to 99 wt %, 10 to 99 wt %, 20 to 99 wt %, 30 to 95 wt %, 40 to 90 wt %, or the like based on the total weight of the composition. Also, in some cases, the epoxidized oil may be included at a content of 1 to 50 wt %, 5 to 50 wt %, 10 to 40 wt %, 10 to 45 wt %, 10 to 40 wt % or the like.

The epoxidized oil may be, for example, one or more selected from the group consisting of epoxidized soybean oil (ESO), epoxidized castor oil, epoxidized linseed oil (ELO), epoxidized palm oil, epoxidized stearate, epoxidized oleate, epoxidized tall oil and epoxidized linoleate.

Preferably, the epoxidized oil may be one or more selected from the group consisting of ESO and ELO.

When the above-described epoxidized oil is used in a plasticizer, the plasticizer may exhibit an improvement in thermal resistance, plasticization efficiency, an absorption rate and volatile loss compared to existing products, have relatively excellent economic feasibility compared to other products capable of improving thermal resistance, and be appropriately used as a plasticizer capable of improving mechanical and physical properties.

In addition, according to an embodiment of the present invention, the plasticizer composition may further include a trimellitate-based material, and the trimellitate-based material may be represented by Chemical Formula 1 below.

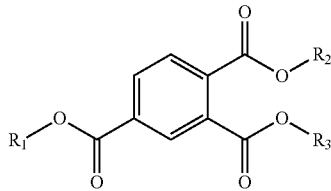

[Chemical Formula 1]

In Chemical Formula 1, $R_1$ to $R_3$ are each independently an alkyl group having 8 to 12 carbon atoms, and a sum of the number of carbon atoms in the alkyl groups of $R_1$ to $R_3$ is 25 to 36.

In Chemical Formula 1, $R_1$ to $R_3$ may have 8 to 12 carbon atoms and may be the same. When $R_1$ to $R_3$ are different, two of $R_1$ to $R_3$ may be the same and the remaining one may be a different alkyl group.

In addition, when the alkyl group has 8 carbon atoms, a linear alkyl group is preferably applied in terms of quality, but, commercially, a branched alkyl group is excellent in terms of economic feasibility. When an alkyl group having 9 to 12 carbon atoms is applied, a branched alkyl group is preferably applied instead of a linear alkyl group, but a linear alkyl group may achieve a more excellent effect of improving properties such as cold resistance and the like.

Specifically, the trimellitate-based material may be prepared by esterification between trimellitic acid (TMA) or trimellitate anhydride and an alcohol having 8 to 12 carbon atoms. When the number of carbon atoms is 8, two or more alcohols are mixed and reacted, and thus a case in which trimellitate having three alkyl groups that all have 8 carbon atoms is applied may be excluded.

That is, when an alcohol having 8 carbon atoms is applied, the alcohol is mixed with an alcohol having 9 to 12 carbon atoms and reacted such that trimellitate having three different alkyl groups may be applied. When an alkyl group having 9 to 12 carbon atoms is applied, trimellitate having three identical alkyl groups may be applied.

The trimellitate-based material may be, for example, triisononyl trimellitate, bis(n-octyl)isononyl trimellitate, bisisononyl(n-octyl) trimellitate, bisisodecyl(n-octyl) trimellitate, bis(n-decyl)(n-octyl) trimellitate, bis(n-octyl)(n-decyl) trimellitate, bis(n-octyl)isodecyl trimellitate, bis(2-propylheptyl)(n-octyl) trimellitate, bis(n-octyl)(2-propylheptyl) trimellitate, tri(n-decyl) trimellitate, triisodecyl trimellitate, or tri(2-propylheptyl) trimellitate.

When a case in which trimellitate having alkyl groups that have less than 8 carbon atoms are bonded to all three ester groups is applied, performance may be degraded in terms of properties such as volatile loss, tension/elongation retention, and the like, and cost competitiveness may be deteriorated due to a limited supply of an alcohol as a raw material. Also, when butanol, which has a small number of carbon atoms, is applied, malicious waste water including butanol may be generated. The upper limit of the number of carbon atoms of the alkyl group is preferably 12, and when the upper limit is greater than 12, a molecular weight of the alkyl group is excessively increased such that properties such as an absorption rate, plasticization efficiency, and the like may be degraded.

In particular, when a branched alkyl group having 8 carbon atoms is applied, di(2-ethylhexyl) phthalate (DEHP), which is designated as an environmentally hazardous substance, may be generated due to phthalic acid essentially included in TMA, and even when a content thereof is small, a material which is not free from environmental issues may be generated. As such, although the branched alkyl group of trimellitate is commercially beneficial, it has a disadvantage in that usage thereof is difficult due to environmental issues, and thus it is difficult to accept trimellitate having a branched alkyl group as a non-phthalate product in an actual commercial product.

However, in order to prevent generation of the above-described materials in the present invention, only a trimellitate-based material which does not generate DEHP due to an adjustment of the number of carbon atoms and appropriately choosing a branched type or a linear type may be applied to provide an environmentally-friendly plasticizer composition.

Accordingly, the plasticizer composition according to an embodiment of the present invention does not include DEHP, that is, may be a DEHP-free plasticizer, and may be an environmentally-friendly plasticizer composition.

Here, the plasticizer composition may include an epoxidized oil and a trimellitate-based material at a weight ratio of 99:1 to 1:99, particularly, 99:1 to 5:95, 99:1 to 10:90, 99:1 to 15:85, or 99:1 to 20:80, and, more particularly, at a weight ratio of 95:5 to 20:80 or 90:10 to 25:75.

In addition, in some cases, an excessive amount of the trimellitate-based material is preferably included such as 50:50 to 5:95, 40:60 to 5:95, 30:70 to 5:95, 30:70 to 10:90, or 20:80 to 10:95.

As such, when the trimellitate-based material is used in combination with the epoxidized oil, cold resistance, which is a problem of the epoxidized oil, may be partially improved. Also, when the trimellitate-based material, which has an excellent effect of improving migration but exhibits a slight degradation of economic feasibility, is used, a desired effect in terms of an improvement in properties may be achieved.

However, when the epoxidized oil is included at less than 10 wt %, it is difficult to exhibit a function thereof as a plasticizer in addition to a role thereof as an auxiliary stabilizer of a general plasticizer composition, achieve an effect of improving thermal resistance, and also achieve an effect of improving properties such as resistance to stress, tension/elongation retention, and the like, which may be exhibited when the epoxidized oil is included at a certain content. Therefore, it is necessary to include the epoxidized oil at a content of at least 10 wt % with respect to the total weight of the plasticizer composition.

In the present invention, a method of preparing the plasticizer composition may be performed by a blending method, and the blending method is, for example, as follows.

An epoxidized oil and a trimellitate-based material are prepared and blended at a weight ratio of 1:99 to 99:1 to prepare the plasticizer composition.

The trimellitate-based material may be prepared by direct esterification between one or more alcohols selected from the group consisting of n-octyl alcohol, isononyl alcohol, isodecyl alcohol, and 2-propylheptyl alcohol and TMA or trimellitate anhydride.

The direct esterification may be performed by introducing TMA or trimellitate anhydride to the alcohol and then adding a catalyst to induce a reaction under a nitrogen atmosphere; removing an unreacted alcohol and neutralizing an unreacted acid; and performing dehydration and filtration through distillation under reduced pressure.

Meanwhile, the catalyst may be, for example, one or more selected from an acid catalyst such as sulfuric acid, hydrochloric acid, phosphoric acid, nitric acid, p-toluenesulfonic acid, methanesulfonic acid, ethanesulfonic acid, propanesulfonic acid, butanesulfonic acid, alkyl sulfuric acid, and the like; a metal salt such as aluminum lactate, lithium fluoride, potassium chloride, cesium chloride, calcium chloride, iron chloride, aluminum phosphate, and the like; a metal oxide such as a heteropoly acid and the like; and an organic metal such as a natural/synthetic zeolite, cation- and anion-exchange resins, tetraalkyl titanate, a polymer thereof, and the like. As a specific example, the catalyst may be tetraalkyl titanate.

An amount of the catalyst to be used may vary according to the type thereof. For example, a homogeneous catalyst may be used at an amount of 0.01 to 5 wt %, 0.01 to 3 wt %, 1 to 5 wt %, or 2 to 4 wt % with respect to 100 wt % of a total weight of the reactants, and a heterogeneous catalyst may be used at an amount of 5 to 200 wt %, 5 to 100 wt %, 20 to 200 wt %, or 20 to 150 wt % with respect to the total weight of the reactants.

In this case, a reaction temperature may be in a range of 180 to 280° C., 200 to 250° C., or 210 to 230° C.

The plasticizer composition thus prepared is included at an amount of 5 to 150 parts by weight, 40 to 100 parts by weight, or 40 to 50 parts by weight with respect to 100 parts by weight of a resin selected from ethylene vinyl acetate, polyethylene, polypropylene, polyvinyl chloride, polystyrene, polyurethane, and a thermoplastic elastomer, and thus a resin composition which is effective in both compound formulation and sheet formulation may be provided.

The resin composition may be applied for the use such as compounds for power lines, electric power lines, communication cables and the like, flooring materials, interior materials for automobiles, and the like.

The invention claimed is:

1. A plasticizer composition comprising an epoxidized oil and a trimellitate-based material,
   wherein a weight ratio of the epoxidized oil and the trimellitate-based material is 70:30 to 15:85,
   wherein the trimellitate-based material is one or more selected from the group consisting of triisononyl trimellitate and a reaction product of n-octyl alcohol, n-decyl alcohol and trimellitic acid, and
   wherein the epoxidized oil is epoxidized soybean oil.

2. The plasticizer composition of claim 1, wherein the plasticizer composition is a di(2-ethylhexyl) phthalate-free plasticizer.

3. A resin composition comprising 100 parts by weight of a resin; and 5 to 150 parts by weight of the plasticizer composition according to claim 1.

4. The resin composition of claim 3, wherein the resin is one or more selected from the group consisting of ethylene vinyl acetate, polyethylene, polypropylene, polyketone, polyvinyl chloride, polystyrene, polyurethane, and a thermoplastic elastomer.

5. An article prepared from the resin composition of claim 3, wherein the article is selected from the group consisting of electric wires, flooring materials, interior materials for automobiles, films, sheets, wallpaper, and tubes.

* * * * *